United States Patent
Lau et al.

(10) Patent No.: US 9,009,077 B2
(45) Date of Patent: *Apr. 14, 2015

(54) OVER-THE-AIR DELIVERY OF METERING CERTIFICATES AND DATA

(75) Inventors: Kevin Lau, Sammamish, WA (US); Scott Plette, Seattle, WA (US); Clifford P. Strom, Sammamish, WA (US); Alex McKelvey, Seattle, WA (US); Jonathan Billings, Northampton (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 93 days.

This patent is subject to a terminal disclaimer.

(21) Appl. No.: 13/053,507

(22) Filed: Mar. 22, 2011

(65) Prior Publication Data

US 2011/0173321 A1 Jul. 14, 2011

Related U.S. Application Data

(63) Continuation of application No. 11/483,309, filed on Jul. 7, 2006, now Pat. No. 7,917,440.

(51) Int. Cl.
G06F 21/00 (2013.01)
G06F 21/10 (2013.01)
G06Q 20/36 (2012.01)

(52) U.S. Cl.
CPC ........ G06F 21/10 (2013.01); *G06F 2221/0775* (2013.01); G06Q 20/3674 (2013.01);
(Continued)

(58) Field of Classification Search
USPC ......................................................... 705/52
See application file for complete search history.

(56) References Cited

U.S. PATENT DOCUMENTS 5,715,403 A 2/1998 Stefik
5,946,614 A 8/1999 Robbins et al.
(Continued)

FOREIGN PATENT DOCUMENTS

CN 1690913 11/2005
DE 10257159 6/2004
(Continued)

OTHER PUBLICATIONS

Chinese 1st Office Action in Application 200780025384.0, mailed May 20, 2010, 14 pgs.
(Continued)

*Primary Examiner* — James A Reagan
(74) *Attorney, Agent, or Firm* — Danielle Johnston Holmes; Sade Fashokun; Micky Minhas (57) ABSTRACT

Metering is enabled through an arrangement in which a metering certificate is communicated to a mobile device using an over-the-air protocol. A metering trigger provides the metering certificate that includes a location to which metering data is posted by the mobile device and a public key of a public-private key pair, or alternatively provides a link to such metering certificate. A metering helper passes the metering certificate to a DRM system on the mobile device which collects metering data associated with the metering ID and uses the public key to encrypt the metering data into a metering challenge. The metering helper posts the metering challenge to the location. The metering service extracts the metering data from the metering challenge using a private key and generates a metering response that is received by the metering helper which prompts the DRM system to reset at least a portion of a data store in which the metering data is stored.

17 Claims, 8 Drawing Sheets

(52) U.S. Cl.
CPC ......... *G06Q20/3678* (2013.01); *Y10S 705/902* (2013.01); *Y10S 705/901* (2013.01); *Y10S 705/911* (2013.01); *Y10S 705/904* (2013.01); *Y10S 705/908* (2013.01); *Y10S 705/903* (2013.01); *Y10S 705/905* (2013.01); *Y10S 705/906* (2013.01); *Y10S 705/907* (2013.01); *Y10S 705/909* (2013.01); *Y10S 705/91* (2013.01); *Y10S 705/912* (2013.01)

(56) References Cited

U.S. PATENT DOCUMENTS

| | | | |
|---|---|---|---|
| 6,175,825 | B1 | 1/2001 | Fruechtel |
| 6,199,068 | B1 | 3/2001 | Carpenter |
| 6,493,551 | B1 | 12/2002 | Wang et al. |
| 6,532,365 | B1 | 3/2003 | Anderson et al. |
| 6,603,761 | B1 | 8/2003 | Wang et al. |
| 7,046,682 | B2 | 5/2006 | Carpenter et al. |
| 7,917,440 | B2 | 3/2011 | Lau et al. |
| 2002/0029197 | A1 | 3/2002 | Kailamaki et al. |
| 2002/0035617 | A1 | 3/2002 | Lynch et al. |
| 2003/0137976 | A1 | 7/2003 | Zhu et al. |
| 2004/0064351 | A1 | 4/2004 | Mikurak |
| 2004/0073515 | A1* | 4/2004 | Stefik et al. ............... 705/52 |
| 2004/0103305 | A1 | 5/2004 | Ginter et al. |
| 2004/0107125 | A1 | 6/2004 | Guheen et al. |
| 2004/0205510 | A1 | 10/2004 | Rising, III |
| 2004/0249768 | A1 | 12/2004 | Kontio et al. |
| 2005/0054324 | A1 | 3/2005 | Chmaytelli et al. |
| 2005/0090230 | A1 | 4/2005 | Liao et al. |
| 2005/0154909 | A1 | 7/2005 | Zhang et al. |
| 2005/0251403 | A1 | 11/2005 | Shuey |
| 2006/0010076 | A1* | 1/2006 | Cutter et al. ............... 705/63 |
| 2006/0036520 | A1 | 2/2006 | O'Neill |
| 2006/0097892 | A1 | 5/2006 | Zigdon et al. |
| 2007/0005795 | A1* | 1/2007 | Gonzalez ............... 709/232 |
| 2007/0112676 | A1 | 5/2007 | Kontio et al. |
| 2007/0150480 | A1 | 6/2007 | Hwang et al. |
| 2008/0263579 | A1* | 10/2008 | Mears et al. ............... 725/9 |

FOREIGN PATENT DOCUMENTS

| | | | |
|---|---|---|---|
| DE | 10257159 A1 * | 6/2004 | ............... H04L 9/32 |
| JP | 2002-7750 | 1/2002 | |
| JP | 2002-207934 | 7/2002 | |
| JP | 2002-236854 | 8/2002 | |
| JP | 2003-223592 | 8/2003 | |
| JP | 2003-345452 | 12/2003 | |
| JP | 2004-46286 | 2/2004 | |
| JP | 2006-41670 | 2/2006 | |
| JP | 2006-126983 | 5/2006 | |
| KR | 1020030030586 | 4/2003 | |
| KR | 1020030097465 | 12/2003 | |
| KR | 1020050003693 | 1/2005 | |
| KR | 1020060079816 | 7/2006 | |
| WO | WO 00/58811 | 10/2000 | |
| WO | WO 00/59150 | 10/2000 | |
| WO | WO 01/52021 | 7/2001 | |
| WO | WO 2005/088450 | 9/2005 | |

OTHER PUBLICATIONS

Chinese 2nd Office Action in Application 200780025384.0, mailed Aug. 23, 2011, 8 pgs.
Chinese Notice of Allowance in Application 200780025384.0, mailed Dec. 1, 2011, 4 pgs.
Gazis et al., "A Flexible Charging & Billing Approach for the Emerging UMTS Network Operator Role", http://citeseer.ist.psu.edu/cache/papers/cs/23863/http:zSzzSzcnl.di.uoa.grzSzpublicationszSzATS2001.pdf/gazisO1flexible.pdf, 7 pgs.
Japanese Notice of Allowance in Application 2009519472, mailed Nov. 15, 2011, 6 pgs.
Japanese Notice of Rejection in Application 2009519472, mailed Jul. 29, 2011, 4 pgs.
Koutsopoulou et al., "Subscription management and charging for value added services in UMTS networks", Date: 2001, pp. 2162-2166, vol. No. 3, http://ieeexplore.ieee.orglxpl/freeabs_all.jsp?arnumbeF945079, 5 pgs.
mVideoGuard TM Mobile DRM Solutions, http://www.nds.com/pdfs/mVideoGuard.pdf, 8 pgs.
PCT International Search Report, PCT/US2007/015598, Dated: Jan. 9, 2008, pp. 1-10.
U.S. Appl. No. 11/483,309, Amendment and Response filed Sep. 8, 2010, 16 pgs.
U.S. Appl. No. 11/483,309, Notice of Allowance mailed Nov. 19, 2010, 12 pgs.
U.S. Appl. No. 11/483,309, Office Action mailed Mar. 10, 2010, 12 pgs.
Vasanta, H. Distributed Management of OMA DRM Domains 2006. Retrieved on Google Nov. 10, 2010, 18 pgs.
EP Extended Search Report in Application 07810256.3, mailed Jun. 26, 2012, 8 pgs.
Evans, P. "DRM: Is the Road to Adoption Fraught with Potholes?", Seybold Reporting Analyzing Publishing Technologies, 2001, 1(14), 32.
Fowler, T.B. "Technology's Changing Role in Intellectual Property Rights", IT Professional (IEEE), 2002, 4(2), 39-44.
Gable, J. "The Digital Rights Conundrum", Transform Magazine, 2001, 10(11),27.
Griswold, G.N. "A Method for Protecting Copyright on Networks", IMA Intellectual Property Project Proceedings, 1994, 1(1), 169-178.
Gunter, C.A., et al. "Models and Languages for Digital Rights", Proceedings of the 34th Annual Hawaii International Conference on System Sciences, 2001, 1-5.
Hong, S. et al., "On the construction of a powerful distributed authentication server without additional key management", Computer Communications, 2000, 23, 1638-1644.
Housley, R. et al., "Metering: A Pre-Pay Technique", Proceedings of the SPIE—The International Society for Optical Engineering, 1997, 3022, 527-531.
Hwang, C. et al., "Protection of Digital Contents on Distributed Multimedia Environment", Proceedings of the LASTED International Conference, Internet and Multimedia Systems and Applications, Nov. 19-23, 2000, Las Vegas, Nevada, USA, pp. 127-132.
Jakobsson, M. et al., "Proprietary Certificates", Topics in Cryptology, 2002, 164-181.
Kahn, R.E. "Deposit, Registration and Recordation in an Electronic Copyright Management System", IMA Intellectual Property Project Proceedings, 1994, 1(1), 111-120.
Kumik, P. "Digital Rights Management", Computers and Law, 2000, 11(4), 14-15.
Managing Digital Rights in Online Publishing, "How two publishing houses maintain control of copyright" Information Management & Technology, 2001, 34(4), 168-169.
Ogata, W. et al., "Provably Secure Metering Scheme", Advances in Cryptology—Asia CRYPT, 6th International Conference on the Theory and Application of Cryptology and Information Security Proceedings (Lecture Notes in Computer Science 1976), 2000, pp. 388-398.
Peinado, M. "Digital rights management in a multimedia environment", SMPTE Journal, 2002, 111(3), 159-163.
Royan, B. Content creation and rights management; experiences of SCRAN (the Scottish Cultural Resources Access Network), Program, 2000, 34(2), 131-142.
Seok Kim, S. et al., "A Secure and Efficient Metering Scheme for Internet Advertising", Journal of KISS: Computer Systems and Theory, 2002, 29(3-4), 153-160.
Torrubia, A. et al., "Cryptography regulations for E-commerce and digital rights management", Computers & Security, 2001, 20(8), 724-738.
Valimaki, M. et al., "Digital rights management on open and semi-open networks", WIAPP, 2001, 154-155.
Yu, H. "Digital multimedia at home and content rights management", IEEE, Proceedings 2002 IEEE 4th International Workshop on Networked Appliances, 2002, 49-56.
Zwollo, K. "Digital document delivery and digital rights management", Information Services & Use, 2001, 9-11.

(56) References Cited

OTHER PUBLICATIONS

Israeli Office Action in Application 195274, dated Mar. 21, 2012, mailed Jun. 11, 2012, 3 pgs.
Canadian Office Action in Application 2654114, mailed Apr. 2, 2014, 2 pgs.
European Official Communication in Application 07810256.3, mailed Jul. 13, 2012, 1 page.
Korean Notice of Preliminary Rejection in Application 10-2009-7000104, mailed Aug. 1, 2013, 10 pgs.
Korean Final Rejection in Application 10-2009-7000104, mailed Feb. 27, 2014, 6 pgs.
Chinese 1st Office Action in Application 201210041723.7, mailed May 6, 2014, 17 pgs.
Chinese 2nd Office Action in Application 201210041723.7, mailed Jul. 24, 2014, 11 pgs.

* cited by examiner

OVER-THE-AIR DELIVERY OF METERING CERTIFICATES AND DATA

CROSS REFERENCE TO RELATED APPLICATIONS

This application is a Continuation of, and claims the benefit of priority to, U.S. patent application Ser. No. 11/483,309, filed on Jul. 7, 2006, and titled "Over-The-Air Delivery of Metering Certificates and Data", which is incorporated herein by reference for all purposes.

BACKGROUND

Metering is a technology that enables digital media content providers to track the usage of protected media content. Metering is not generally used to track the listening habits of individual users but is rather a tally of how many times a particular piece of media content item is used (for example, how often the media content is played or copied). Thus, metering can serve a number of possible business models, such as a fee-for-use model, or a subscription model where users pay a periodic fee, (for example, every month) to enjoy limited use of media content selected from an online catalog. If the user chooses not to continue his or her subscription, the licenses for any content simply expire, disabling playback.

A media content provider commonly enables a media player running on a personal computer ("PC") or mobile device with the capability to collect and report metering data for media content that has been protected with copy protection like digital rights management ("DRM") technology. Such metering capability may be developed for such platforms, for example, through use of a software development kit ("SDK") that is licensed from a system developer. Metering provides several benefits, one of which is to reduce royalty fees for those content provider services that license content and then resell it to their customers. Royalty fees are based on the type of sale, such as whether the sale is a permanent transfer or a metered single play. Since the cost of a metered single play is much less than the cost of a permanent transfer, metering content is often much more economical for the content provider. Metering also provides other benefits. By metering content, a content provider can determine which content is more popular, identify and pay the artists whose content is played, and track the number of times an advertisement is viewed, for example.

Current metering arrangements, while satisfactory in many applications, are typically dependent on a proxy device such as a PC that functions as an intermediary between a metering service and a mobile device using, for example, a docking-type connection. The PC is used to deliver a metering certificate (which identifies the location to which metering data is to be reported) to the mobile device as well as trigger a metering event. However, the mobile device is thus unable to receive a metering certificate and report metering data when it is not coupled to the proxy device.

SUMMARY

Metering is enabled through an arrangement in which a metering certificate is communicated to a mobile device using an over-the-air protocol. In various illustrative examples, a metering service sends to a mobile device a metering trigger that includes a metering certificate, or alternatively, a link to a metering certificate. The metering certificate includes a location to which metering data is to be posted by the mobile device, a metering ID, and a public key of a public-private key pair.

The mobile device is provisioned with a metering helper application which is started upon receipt of the metering trigger. The metering helper application passes the metering certificate to a DRM system on the mobile device. The DRM system collects metering data associated with the metering ID and uses the public key to encrypt the collected metering data into a metering challenge. The DRM system passes the metering challenge to the metering helper application which posts it to the location identified in the metering certificate. The metering service extracts the metering data from the metering challenge using a private key of the public-private key pair. The metering service generates a metering response that is received by the metering helper application which prompts the DRM system to reset at least a portion of a data store in which the metering data is stored.

The present arrangement advantageously enables media content to be readily accessed and consumed by a consumer using a mobile device in preferred locations without the need for a proxy device to receive a metering certificate or enable reporting of metering data to the metering service.

DETAILED DESCRIPTION

Figure 1:
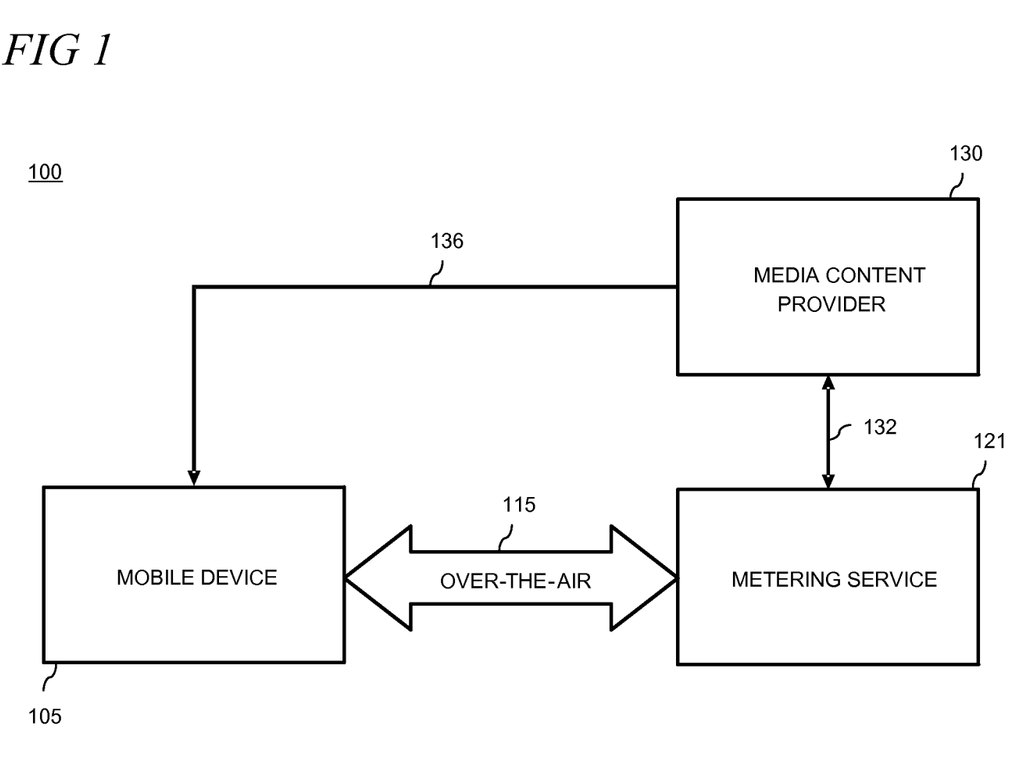
FIG. 1 is a block diagram of an illustrative arrangement for delivering a metering certificate and reporting metering data over-the-air.

Turning to the drawings, where like numerals designate like components or elements, FIG. 1 is a block diagram of an illustrative arrangement 100 for delivering a metering certificate and reporting metering data over-the-air. As shown in FIG. 1, a mobile device 105 is provided with over-the-air communications 115 with a metering service 121. "Over-the-air" as used herein means an arrangement in which any type of wireless communication using open space as its transmission medium is utilized for communications between the mobile device 105 and metering service 121. Over-the-air communication may be enabled, for example, between the mobile device 105 and metering service 121 with the Short Messaging Service ("SMS") using the Wireless Application Protocol ("WAP"). For example, as described in detail below, the metering service may send a WAP Push SMS message to the mobile device 105, although Direct Push (i.e., IP push) messaging arrangements may also employ over-the-air communications.

Mobile device 105, in this illustrative example, is selected from any one of a variety of mobile devices that are commonly used by consumers to select, access and consume media content such as music, video, audio, news, ring tones, games, data, or the like. Accordingly, mobile device 105 is selected from one of portable media player, personal digital assistant, pocket PC, music player, mobile phone, smart phone, handheld game device or the like. However, it is emphasized that this list of devices is merely illustrative as the benefits and features of over-the-air delivery of metering certificates and metering data may be realized by many types of electronic devices that are configured to render or otherwise consume media content when arranged to implement the features described herein.

Metering service 121 is representative of a service that collects and processes metering data. Metering service 121 may be provided, for example, by a metering aggregation service that is contracted by a media content provider 130 (e.g., a media content licensor or subscription service provider), or a media content owner as indicated by line 132 in FIG. 1. Alternatively, metering service 121 is provided directly by the media content provider 130 to the mobile device 105 (this alternative arrangement is not shown in FIG. 1). Metering service 121, in this illustrative example, is implemented using an application or data server that is configured to send and receive communications to and from mobile device 105 to thereby implement a server-client-type architecture.

Media content provider 130 is typically arranged to provide media content to mobile device 105 as indicated by line 136. Such media content is deliverable using a variety of mechanisms including the transfer of a physical media (i.e., an optical disc such as CD, DVD, high-definition disc, Flash memory card etc.) to the mobile device 105, or via download from the media content provider 130. In addition, although not mandatory in the present arrangement, media content provider 130 commonly provides a license, such as a DRM license, to mobile device 105 from a license server or rights management server (not shown). Such license generally provides the usage rules, rights or restrictions that the media content provider 130 imposes on the use of the delivered media content. The license also commonly includes a metering ID that is associated with the delivered media content so that metering data for that particular media content may be tracked and reported separately from media content delivered by another media content provider (for example, a consumer may subscribe to two music services and download metered media content from each). In this illustrative example, the delivered media content and the license are deliverable over-the-air or alternatively using a proxy device such as a PC.

Figure 2:
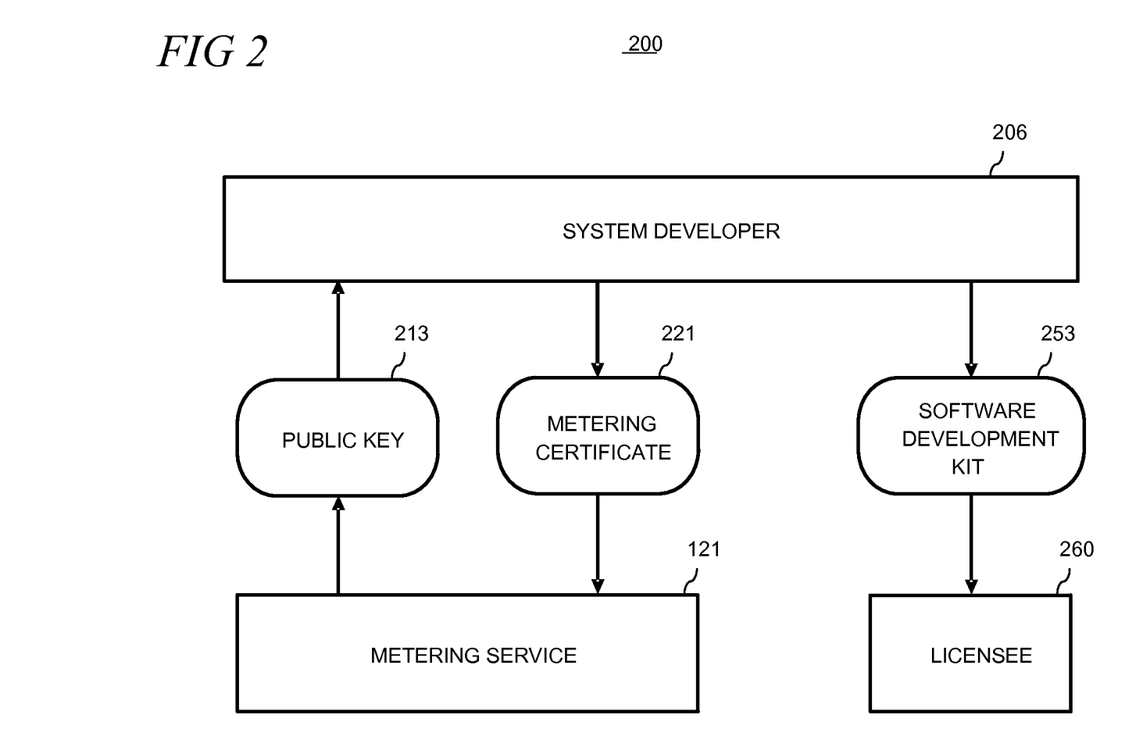
FIG. 2 is a block diagram showing an illustrative arrangement in which a system developer provides a metering certificate to a metering service, receives a public key from the metering service, and provides a software development kit to a licensee.

FIG. 2 is a block diagram showing an illustrative arrangement 200 in which a system developer 206 provides a metering certificate 221 and to the metering service 121 (FIG. 1) and receives a public key 213 from the metering service 121. The public key 213 is part of a public-private key pair that is typically generated by the metering service 121 and used to implement secure communication of data between a server and a client using known cryptographic techniques without requiring that passwords or other keys be exchanged in the clear. The metering service 121 sends the public key 213 to the system developer 206 for certification while retaining the private key of the public-private key pair that is needed to decrypt information encrypted with the public key 213. The system developer 206 creates the metering certificate 221 with the embedded public key 213 as shown in FIG. 4 and described in more detail in the accompanying text below.

As shown in FIG. 2, system developer 206 also provides a software development kit ("SDK") 253 to a licensee 260. In some applications of over-the-air delivery of metering certificates and metering data, the licensee 260 is the media content provider 130 (FIG. 1) or media content owner. Alternatively, licensee 260 is metering service 121 or another entity. In the present arrangement, the licensee 260 typically utilizes the SDK 253 to create a metering helper application that is configured to run on the mobile device 105 and which facilitates over-the-air delivery of metering certificates and metering data. The metering helper application is described in detail in the text accompanying FIG. 5.

Figure 3:
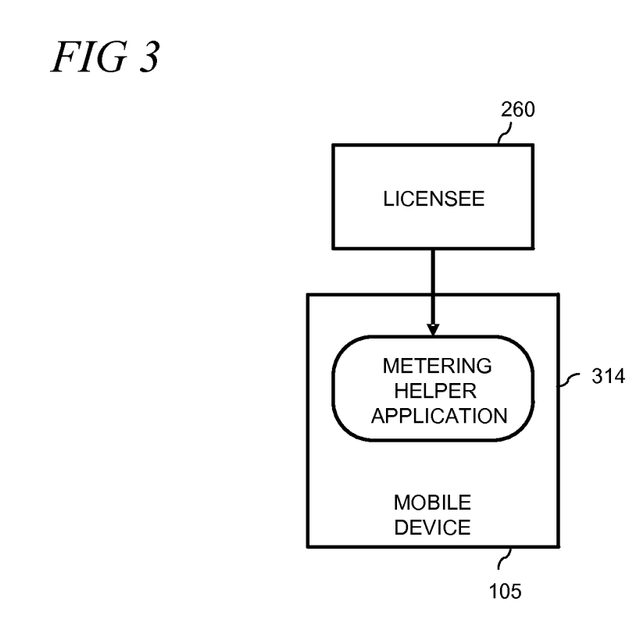
FIG. 3 is a block diagram showing an illustrative arrangement in which a licensee provides a metering helper application to a mobile device.

As shown in FIG. 3, the licensee 260 provides a metering helper application 314 to the mobile device 105. The metering helper application 314 is pre-provisioned to the mobile device 105 in some settings of over-the-air delivery of metering certificates and metering data. In other settings, the metering helper application 314 is arranged to be downloaded by the mobile device 105 (FIG. 1) as an application or plug-in as needed or on-demand.

Figure 4:
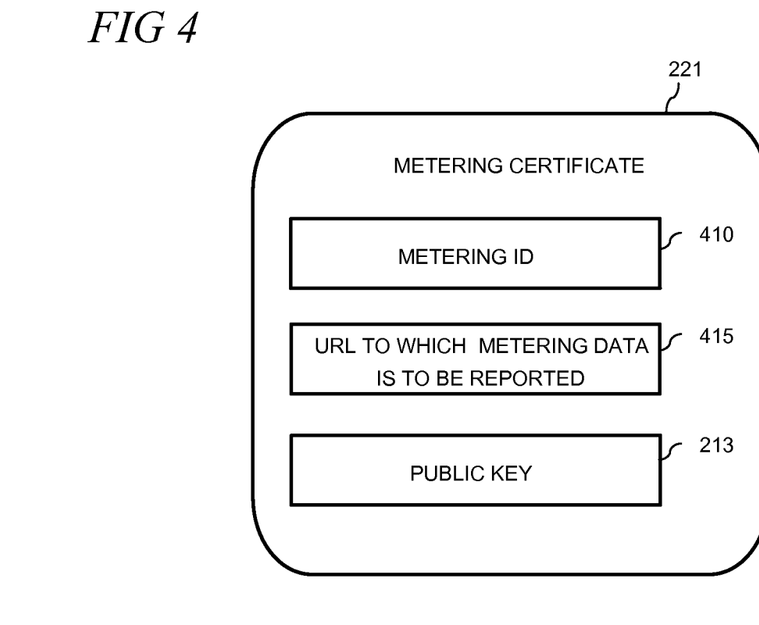
FIG. 4 is a diagram showing an illustrative metering certificate.

FIG. 4 is a diagram showing an illustrative arrangement for the metering certificate 221 shown in FIG. 2. As shown in FIG. 4, metering certificate 221 includes three components including a metering ID 410, URL (uniform resource locator) 415 and public key 213. Metering ID 410 is used to identify the content provider for which metering data is being collected in cases where a consumer is anticipated to have media content stored on mobile device 105 that comes from more than one content provider.

URL 415 provides the address to which metering data is to be reported by the mobile device 105. In this illustrative example, metering data is posted to the URL 415 using the HTTP POST command. HTTP, or hypertext transfer protocol, is an open internet protocol used to implement asynchronous communications between a client and a server. Typically, the URL 415 shares a common domain name with the license source such as the license server or rights management server described above in the text accompanying FIG. 1.

Figure 5:
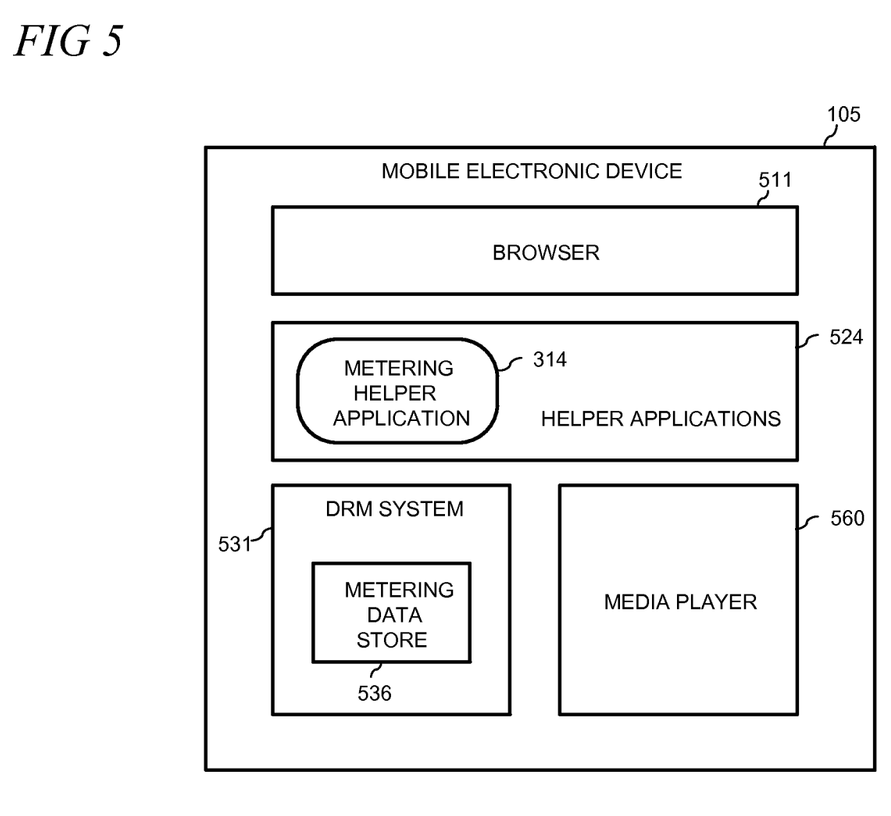
FIG. 5 is a diagram showing the components of an illustrative mobile device that is arranged to receive a metering certificate and report metering data over-the-air.

FIG. 5 is a diagram showing an illustrative arrangement for mobile device 105 (FIG. 1). Mobile device 105 is configured to include a networking interface such as the browser 511 shown in FIG. 5. Alternatively, the networking interface may comprise a WAP/HTTP handler or a Direct Push handler. The networking interface (e.g., browser 511) is arranged to send and receive messages and other data using over-the-air communication protocols. Mobile device 105 is further configured to include one or more helper applications 524, a DRM system 531 and a media player 560.

Helper applications 524 may include one or more applications that are configured to perform a variety of tasks depending on the specific configuration of the mobile device 105. Helper applications 524 are used in settings where browsers do not include enough functionality to interact directly with a DRM system, as is often the case with browsers that are arranged to operate on mobile devices. Typically, the helper applications 524 reside at the native level of the mobile device 105 and act as a proxy between the browser 511 and the DRM system 531. Accordingly, helper applications 524 have interfaces to both the browser 511 and DRM system 531 and are identified as trusted entities to each.

In this illustrative example, helper applications 524 include metering helper application 314 as shown. Metering helper application 314 is used by the mobile device 105 to implement the message flow shown in FIG. 6 and described in the accompanying text. Helper applications 524 may also include a license acquisition helper, for example.

DRM system 531 in FIG. 5 is used to implement the secure receipt of media content from the media content provider 130 (FIG. 1) and further enables use and playback of the media content on the media player 560 in accordance with the usage rules, rights, or restrictions imposed by the license associated with the media content. In addition, DRM system 531 records and stores metering data for metered media content, typically by metering ID, that is stored on, and later reported by the mobile device 105. DRM system 531 thus includes a metering data store 536 that is used to store metering data recorded by DRM system 531.

Figure 6:
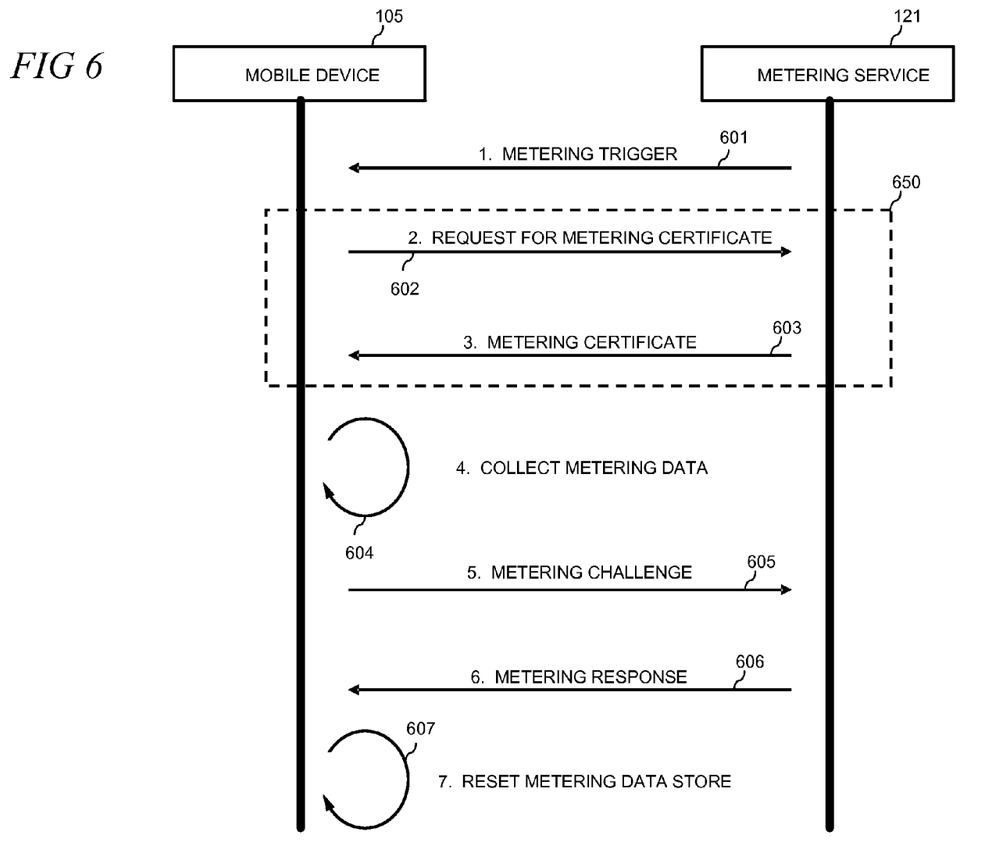
FIG. 6 is a diagram showing an illustrative message flow between a mobile device and a metering service.

FIG. 6 is a diagram showing an illustrative message flow between the mobile device 105 and metering service 121 that is arranged in a sequence of seven steps. Metering service 121 first generates a metering trigger 601 to initiate a request for a metering report from the mobile device 105. In various alternative implementations, metering trigger 601 is arranged as a WAP Push SL (serviceload) SMS that is directed towards a particular consumer or subscriber using the mobile device 105, or as a WAP Push SI (service indicator) SMS if a user "accept" prompt is desired. The metering trigger 601 (e.g., WAP Push) contains a URL to the metering certificate 221 (FIG. 4).

Figure 7:
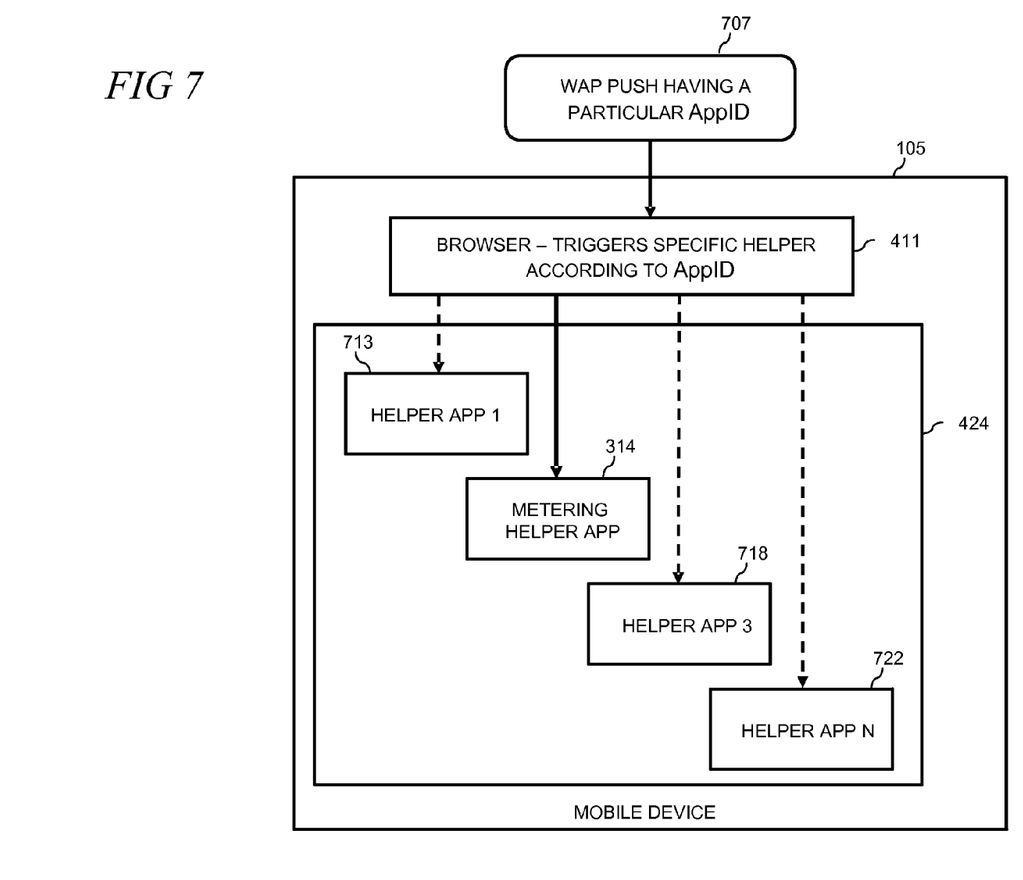
FIG. 7 is a diagram showing an illustrative arrangement for handling a WAP push that includes a particular AppID.

As shown in FIG. 7, the WAP Push may include a particular WAP AppID that is configured so that, upon receipt by browser 411, a specific helper application among the helper applications 424 disposed on mobile device 105 is triggered. In an illustrative example shown in FIG. 7, the WAP AppID contained in WAP Push SMS message 707 is set to trigger metering helper application 314 among the remaining helper applications 1, 2 . . . N as indicated respectively by reference numerals 713, 718 and 722.

Returning back to the metering trigger 601 in FIG. 6, optionally, if a direct data push (e.g., an IP Push) is able to be used with mobile device 105, then a WAP Push in not necessary. Instead, metering service 121 may send a message to mobile device 105 which incorporates the metering certificate 221 itself (rather than a URL for the metering certificate as described above) in the body of the message. In this case, the metering helper application 314 is invoked through the message MIME type (Multipurpose Internet Mail Extension), as described below, but the metering helper application 314 skips to step four (collect metering data).

As indicated by reference numeral 602, upon receipt of the metering trigger 601 (e.g., the WAP Push SMS message), the metering helper application 314 in mobile device 105 follows the URL contained in the metering trigger 601 to obtain the metering certificate 221, typically using HTTP. The metering service 121 returns the metering certificate 221 to the mobile device as shown by reference numeral 603. As noted above, in cases where a Direct Push message is utilized, steps 3 and 4 are not required as indicated by the dashed rectangle 650 in FIG. 6.

It is further noted that there is no requirement that the mobile device 105 begins collecting the requested metering data or send back its metering report immediately upon receiving the metering trigger 601. Depending on the requirements of a specific application of over-the-air delivery of metering certificates and metering data, the mobile device 105 is arranged to perform the collecting and reporting at some later time.

Figure 8:
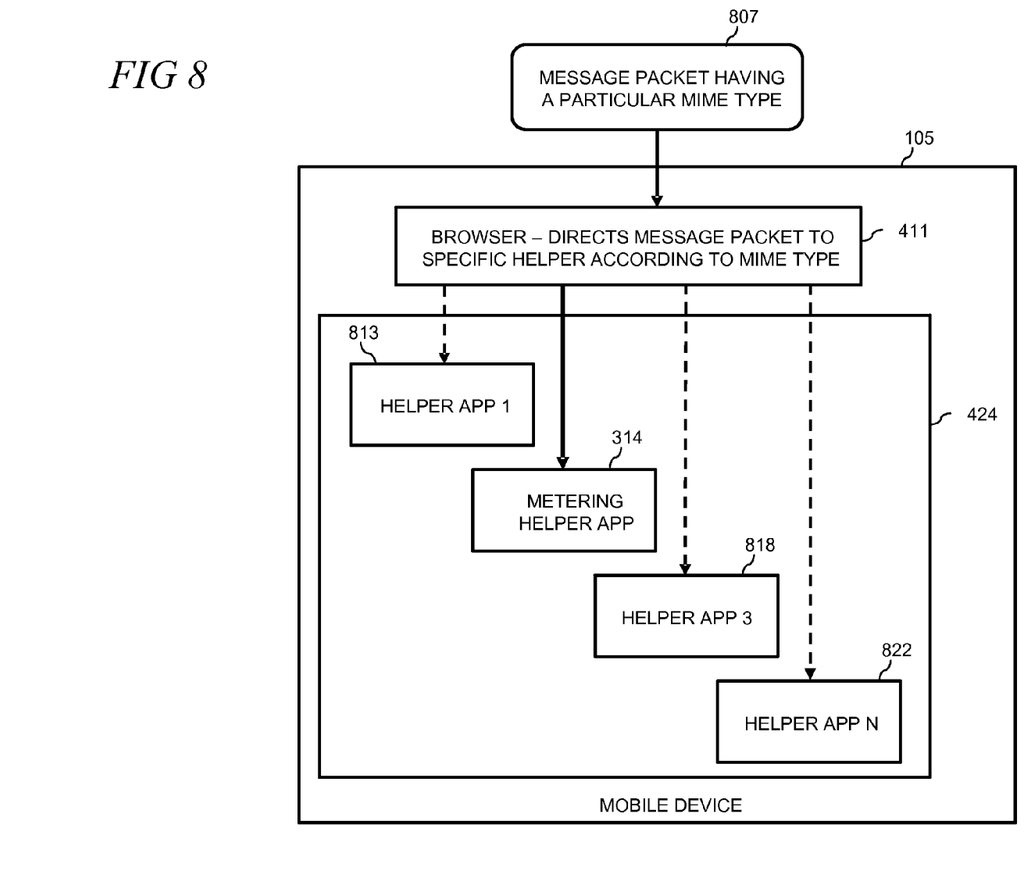
FIG. 8 is a diagram showing an illustrative arrangement for handling a message packet that includes a particular MIME type.

As shown in FIG. 8, the messages sent by the metering service 121 (FIG. 1) to mobile device 105 (FIG. 1) are configurable with a set one of a plurality of MIME types. The MIME type is included in the content type field in the HTTP header. Upon receipt by browser 411 of a particular MIME type, the appropriate helper application may be triggered, if required, and the message is passed to the helper application for handling. Table 1 shows two illustrative MIME type names and associated description that are configured to direct an incoming message to the metering application helper 314 (FIG. 3). Of course, other helper applications 524 (FIG. 5) would use MIME types other than those listed in Table 1.

TABLE 1

| MIME Type Name | Description |
| --- | --- |
| application/vnd.ms-wmdrm.meter-chlg-req | This MIME type is used for messages from the metering service that contain the metering certificate. |
| application/vnd.ms-wmdrm.meter-resp | This MIME type is used for messages from the metering service which contain the prompt to clear out part or all of the metering data store. |

In an illustrative example shown in FIG. 8, the MIME type of an incoming message packet 807 is set so that the message packet is delivered to the metering helper application 314 among the remaining helper applications 1, 2 . . . N as indicated respectively by reference numerals 813, 818 and 822.

Returning again to FIG. 6, the illustrative message flow continues with collection of metering data at the mobile device 105 as indicated by reference numeral 604. Here, the metering helper application 314 passes the metering certificate 221 received from the metering service 121 to the DRM system 531 (FIG. 5). In particular, metering helper application 314 works through its interface to DRM system 531 which exposes an API (application programming interface) to thereby access and collect the requested metering data. In most applications in which a consumer has stored metered media content from more than one content provider, DRM system 531 collects metering data that is associated with a particular metering ID.

Next, the DRM system 531 generates a metering challenge message 605. The metering challenge 605 incorporates the collected metering data that the DRM system 531 encrypts using the pubic key 213 (FIG. 2) included in the metering certificate 221 passed from the metering helper application 314. Depending on the amount of metering data contained in metering data store 536 and the size of the buffer utilized, more than one metering challenge 605 may be utilized to report all of the appropriate metering data to the metering service 121. DRM system 531 passes the metering challenge 605 to the metering helper application 314. The metering helper application 314 in turn posts the metering challenge 605 to URL 415 (FIG. 4), typically using HTTP POST as noted above.

An optional arrangement may be utilized in cases where the mobile device 105 stores metered content provided by more than one media content provider (so that metering data is stored in metering data store 531 using more than one metering ID). In such cases, metering helper application 314 is configured to report metering data for each of a plurality of metering IDs from DRM system 531 upon receipt of a "report all metering data" trigger. In this case, mobile device 105 acquires a plurality of metering certificates to thereby collect and report the appropriate metering data. Metering application helper 314 then requests that DRM system 531 prepare a plurality of metering challenges using the metering certificates where each one of the plurality of metering challenges contains metering data associated with a particular metering ID. DRM system 531 passes each respective metering challenge to metering helper application 314 which then posts it to the respective metering service associated with the metering ID. Such collection and reporting may be performed in an iterative manner to thereby implement metering reporting to a plurality of metering services in a batch-type arrangement.

Upon receiving the metering challenge 605, the metering service 121 extracts the encrypted metering data contained therein with its private key of the public-private key pair shown in FIG. 2 and described in the accompanying text. The metering service 121 uses or stores the extracted metering data as necessary, for example, to identify and pay artists whose content is being played.

Once the metering data is received and extracted, the metering service 121 generates a metering response message 606 that is sent to the mobile device 105. The metering response 606 is utilized by the client to reset that portion of the metering data store 536 used to store the metering data that is contained in the metering challenge. The metering helper application 314 passes the received metering response 606 to the DRM system 531 to thereby prompt it to reset the appropriate portion of the meter store 536 as indicated by reference numeral 607 in FIG. 6.

Although various illustrative arrangements and methods for over-the-air delivery of metering certificates and metering data have been shown and described, it should be understood that the scope of the claims appended hereto shall not necessarily be limited to the specific features, arrangements or methods described. Instead, the specific features, arrangements or methods are disclosed as illustrative forms over-the-air delivery of metering certificates and metering data as more particularly claimed below.

What is claimed is:

1. A mobile device configured to provide metering data to a metering service server using an over-the-air protocol, the mobile device comprising:
a media player configured to play media content;
a networking interface configured to receive media content from a plurality of media content providers using an over-the-air communication protocol;
a digital rights management (DRM) system configured to enable playback of media content by the media player according to a license associated with the media content, wherein the DRM system generates a plurality of metering challenges, each metering challenge containing metering data associated with a metering ID, the metering ID associated with a particular media content provider, and wherein each metering challenge is encrypted using a public key; and
a metering helper application configured to act as a proxy between the networking interface and the digital rights management (DRM) system, wherein, in response to receiving an all metering data trigger that includes a metering certificate in which the metering helper application receives the plurality of encrypted metering challenges, the metering helper application collects and reports the received plurality of encrypted metering challenges to each metering service associated with one or more metering IDs stored at the mobile device.

2. The mobile device of claim 1, wherein the networking interface is selected from a group comprising at least one of a browser, a WAP/HTTP handler, and a Direct Push handler.

3. The mobile device of claim 1, wherein the license imposes media content usage rules, rights, and restrictions upon the usage of the media content.

4. The mobile device of claim 1, further comprising a metering data store storing a metering identifier identifying the media content provider, the public key and a metering URL to which metering data is to be reported.

5. The mobile device of claim 1, whereby metering reporting to a plurality of metering services is performed in a batch-type arrangement.

6. The mobile device of claim 1, wherein, upon receiving the plurality of encrypted metering challenges, each metering service extracts the encrypted metering data contained therein.

7. The mobile device of claim 1, wherein the encrypted metering data is extracted using a private key paired to the public key.

8. A mobile device configured to provide metering data to a metering service server using an over-the-air protocol, the mobile device comprising:
a media player configured to play media content;
a networking interface configured to receive media content from a plurality of media content providers using an over-the-air communication protocol;
a digital rights management (DRM) system configured to enable playback of media content by the media player according to a license associated with the media content, wherein the DRM system generates a plurality of metering challenges, each metering challenge containing metering data associated with a metering ID, the metering ID associated with a particular media content provider, and wherein each metering challenge is encrypted using a public key; and
a metering helper application configured to act as a proxy between the networking interface and the digital rights management (DRM) system, wherein, in response to receiving an all metering data trigger that includes a metering certificate in which the metering helper application receives the plurality of encrypted metering challenges, the metering helper application collects and reports the received plurality of encrypted metering challenges to each metering service associated with one or more metering IDs stored at the mobile device, whereby metering reporting to a plurality of metering services is performed in a batch-type arrangement.

9. The mobile device of claim 8, wherein the networking interface is selected from a group comprising at least one of a browser, a WAP/HTTP handler, and a Direct Push handler.

10. The mobile device of claim 8, wherein the license imposes media content usage rules, rights, and restrictions upon the usage of the media content.

11. The mobile device of claim 8, further comprising a metering data store storing a metering identifier identifying the media content provider, the public key and a metering URL to which metering data is to be reported.

12. The mobile device of claim 8, wherein, upon receiving the plurality of encrypted metering challenges, each metering service extracts the encrypted metering data contained therein.

13. The mobile device of claim 8, wherein the encrypted metering data is extracted using a private key paired to the public key.

14. A system configured to provide metering data to a metering service server using an over-the-air protocol, the system comprising:
a mobile device, comprising:
a media player configured to play media content;
a networking interface configured to receive media content from a plurality of media content providers using an over-the-air communication protocol;
a digital rights management (DRM) system configured to enable playback of media content by the media player according to a license associated with the media content, wherein the DRM system generates a plurality of metering challenges, each metering challenge containing metering data associated with a metering ID, the metering ID associated with a particular media content provider, and wherein each metering challenge is encrypted using a public key; and a metering helper application configured to act as a proxy between the networking interface and the digital rights management (DRM) system, wherein, in response to receiving an all metering data trigger that includes a metering certificate in which the metering helper application receives the plurality of encrypted metering challenges, the metering helper application collects and reports the received plurality of encrypted metering challenges to each metering service associated with one or more metering IDs stored at the mobile device, whereby metering reporting to a plurality of metering services is performed in a batch-type arrangement;

one or more metering services each metering service configured to extract the encrypted metering data contained therein using a public key paired to the private key.

15. The mobile device of claim 14, wherein the networking interface is selected from a group comprising at least one of a browser, a WAP/HTTP handler, and a Direct Push handler.

16. The mobile device of claim 14, wherein the license imposes media content usage rules, rights, and restrictions upon the usage of the media content.

17. The mobile device of claim 14, whereby metering reporting to a plurality of metering services is performed in a batch-type arrangement.

\* \* \* \* \*